(12) United States Patent
Zhu et al.

(10) Patent No.: US 10,225,387 B2
(45) Date of Patent: Mar. 5, 2019

(54) CALL PROCESSING METHOD AND DEVICE

(71) Applicant: Beijing Xiaomi Mobile Software Co., Ltd., Beijing (CN)

(72) Inventors: Ruixian Zhu, Beijing (CN); Yixing Zou, Beijing (CN); Shuo Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/716,549

(22) Filed: Sep. 27, 2017

(65) Prior Publication Data

US 2018/0091636 A1 Mar. 29, 2018

(30) Foreign Application Priority Data

Sep. 29, 2016 (CN) .......................... 2016 1 0866956

(51) Int. Cl.
*H04M 1/56* (2006.01)
*H04M 15/06* (2006.01)
*H04M 1/57* (2006.01)
*G06F 3/0484* (2013.01)
*H04M 1/725* (2006.01)
*H04M 3/42* (2006.01)
*H04M 3/436* (2006.01)

(52) U.S. Cl.
CPC ........ *H04M 1/575* (2013.01); *G06F 3/04847* (2013.01); *H04M 1/72522* (2013.01); *H04M 3/42059* (2013.01); *H04M 3/436* (2013.01); *H04M 2203/551* (2013.01); *H04M 2250/60* (2013.01); *H04M 2250/68* (2013.01)

(58) Field of Classification Search
CPC .... H04B 7/14; H04L 51/38; H04M 1/274508; H04M 1/274575; H04M 1/575; H04M 1/72522; G06Q 20/027; G06Q 20/20; G06Q 20/3823; G06Q 20/40; G06F 3/0482; G06F 3/04842; G06F 3/0485; G06F 3/0488
USPC .... 379/142.01, 142.04, 142.06, 142.17, 352, 379/354, 355.02; 455/414.1, 414.4, 415
See application file for complete search history.

(56) References Cited

U.S. PATENT DOCUMENTS

| | | | |
|---|---|---|---|
| 5,241,586 A * | 8/1993 | Wilson ................ | H04M 3/2218 379/112.01 |
| 6,088,696 A | 7/2000 | Moon et al. | |
| 6,442,251 B1 * | 8/2002 | Maes .................... | G06F 3/0488 379/110.01 |

(Continued)

FOREIGN PATENT DOCUMENTS

| | | |
|---|---|---|
| CN | 101394437 A | 3/2009 |
| CN | 104902063 A | 9/2015 |

(Continued)

OTHER PUBLICATIONS

Extended European Search Report issued in European Patent Application No. 17169592.7, mailed from the European Patent Office, dated Sep. 1, 2017.

*Primary Examiner* — Binh Kien Tieu
(74) *Attorney, Agent, or Firm* — Finnegan, Henderson, Farabow, Garrett & Dunner LLP

(57) ABSTRACT

A call processing method, applied in a first terminal, includes: when a call request associated with a second terminal is monitored, acquiring an identification of the second terminal; acquiring historical call information corresponding to the identification of the second terminal; and displaying the historical call information on a current call interface of the call request.

15 Claims, 14 Drawing Sheets

(56) References Cited

U.S. PATENT DOCUMENTS

| | | | |
|---|---|---|---|
| 6,795,429 B1* | 9/2004 | Schuster | H04W 92/08 370/352 |
| 7,440,748 B2* | 10/2008 | Matsumoto | H04M 1/274575 379/68 |
| 8,787,897 B2* | 7/2014 | Khosravi | H04M 1/72522 455/414.2 |
| 9,986,052 B1* | 5/2018 | Zuo | H04L 67/22 |
| 2003/0148753 A1* | 8/2003 | Pappalardo | H04M 1/72522 455/405 |
| 2005/0136907 A1* | 6/2005 | Pappalardo | H04M 1/72522 455/418 |
| 2006/0088143 A1* | 4/2006 | Tapaninen | H04M 1/575 379/88.11 |
| 2008/0057927 A1* | 3/2008 | Han | H04M 1/274583 455/415 |
| 2009/0119100 A1* | 5/2009 | Akella | H04M 1/72522 704/235 |
| 2010/0125780 A1* | 5/2010 | Wang | H04N 1/0035 715/232 |
| 2013/0225244 A1* | 8/2013 | Khosravi | H04M 1/72522 455/566 |
| 2014/0164968 A1* | 6/2014 | Aalami | G06F 19/321 715/771 |
| 2014/0211791 A1 | 7/2014 | Cadiz et al. | |
| 2014/0315525 A1 | 10/2014 | Kim et al. | |
| 2014/0331168 A1* | 11/2014 | Wang | G06F 3/0482 715/779 |
| 2014/0342695 A1* | 11/2014 | Gross | G06F 19/322 455/406 |

FOREIGN PATENT DOCUMENTS

| | | |
|---|---|---|
| CN | 104980584 A | 10/2015 |
| CN | 105100360 A | 11/2015 |
| CN | 105704286 A | 6/2016 |
| EP | 2309710 A1 | 4/2011 |

\* cited by examiner

CALL PROCESSING METHOD AND DEVICE

CROSS-REFERENCE TO RELATED APPLICATIONS

The present application is based upon and claims priority to Chinese Patent Application No. 201610866956.9, filed Sep. 29, 2016, the entire contents of which are incorporated herein by reference.

TECHNICAL FIELD

The present disclosure generally relates to the field of call technology, and more particularly, to a call processing method and device.

BACKGROUND

At present, in order to facilitate a user to record important information during a call, a note record option is provided on a call interface. Thus, the user can input call remark information after the note record option is triggered. However, in the related art, call remark information inputted via the note record option is randomly stored in a note application (APP), and when the user wants to view the call remark information, the user needs to switch to the note APP, which may be inconvenient for the user to view and use. Meanwhile, since the call remark information is not associated with the call, after switching to the note APP, the user can only view the call remark information, and may not know which terminal the call remark information corresponds to call content with.

SUMMARY

According to a first aspect of the present disclosure, there is provided a call processing method, applied in a first terminal, the method comprising: when a call request associated with a second terminal is monitored, acquiring an identification of the second terminal; acquiring historical call information corresponding to the identification of the second terminal; and displaying the historical call information on a current call interface of the call request.

According to a second aspect of the present disclosure, there is provided a first terminal, comprising: a processor; and a memory for storing instructions executable by the processor; wherein the processor is configured to: when a call request associated with a second terminal is monitored, acquire an identification of the second terminal; acquire historical call information corresponding to the identification of the second terminal; and display the historical call information on a current call interface of the call request.

According to a third aspect of the present disclosure, there is provided a non-transitory computer-readable storage medium having stored therein instructions that, when executed by a processor of a first terminal, cause the first terminal to perform a call processing method comprising: when a call request associated with a second terminal is monitored, acquiring an identification of the second terminal; acquiring historical call information corresponding to the identification of the second terminal; and displaying the historical call information on a current call interface of the call request.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In exemplary embodiments of the present disclosure, there are provided call processing methods. The call processing methods can be performed by a terminal capable of making a call, such as a mobile phone, a wearable device, etc.

Figure 1:
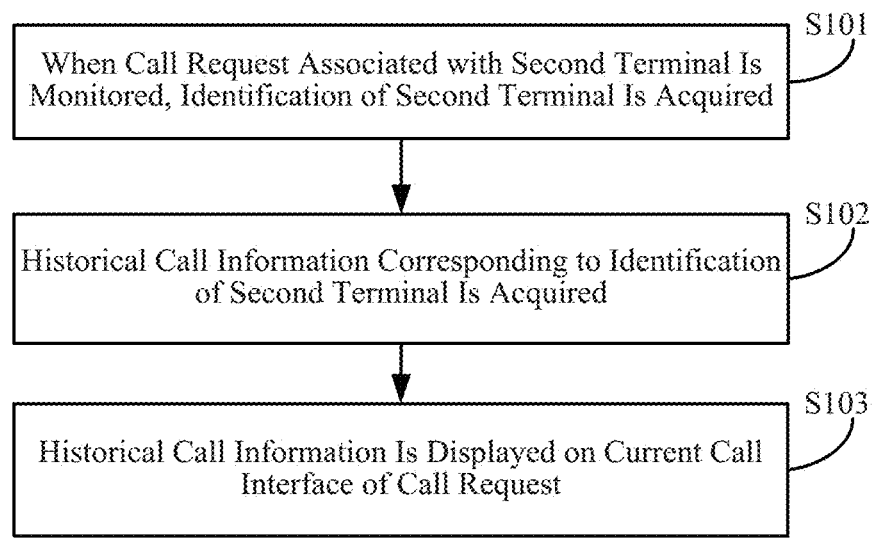
FIG. 1 is a flowchart of a call processing method according to an exemplary embodiment.

FIG. 1 is a flowchart of a call processing method 100, according to an exemplary embodiment. The method 100 is applied in a first terminal. As shown in FIG. 1, the method 100 includes steps S101 to S103.

In step S101, when a call request associated with a second terminal is monitored, an identification of the second terminal is acquired.

The call request can be an incoming call request, an outgoing call request, a voice call request received or initiated by an instant messaging tool, and the like.

If the call request is initiated by the first terminal, the second terminal is a terminal with which the first terminal desires to make a call.

If the call request is received by the first terminal, the second terminal is a terminal which initiates the call request.

The identification of the second terminal can be contact information such as a telephone number, an address, account information of the instant messaging tool, and an appellation, or the like.

In step S102, historical call information corresponding to the identification of the second terminal is acquired.

The historical call information can record various information (such as call key points and remarks) in one or more previous calls between the first terminal and the second terminal, which can be one or more pieces of information, and can be used to help a user of the first terminal to quickly recall previous call contents. Thus, call efficiency can be improved, and ineffective communication due to the user's forgetting previous call contents may be prevented.

The historical call information can be various information, such as a number, a character, an expression, and a picture, and the historical call information can also be empty.

In step S103, the historical call information is displayed on a current call interface of the call request.

In the exemplary embodiment, when the call request is monitored, since the identification of the second terminal is acquired, the historical call information corresponding to the identification of the second terminal can be automatically acquired to be displayed on the current call interface of the call request. Thus, the user of the first terminal may timely understand and recall the recorded historical call information corresponding to the second terminal based on the current call interface, and make an efficient communication with a user of the second terminal.

Further, the historical call information corresponds to the identification of the second terminal, such as the contact information or the appellation. Thus, even if the user of the first terminal does not save, e.g., the contact information of the second terminal in an address book, the user of the first terminal can still find the historical call information according to the contact information of the second terminal displayed on the call interface. Thus, the user of the first terminal can quickly and easily recall the previous call contents without adding the identification of the second terminal to the address book, which is helpful for an efficient communication between the user of the first terminal and the user of the second terminal. The method 100 being capable of automatically finding the historical call information can also avoid the problem that the user of the first terminal needs to switch to an interface of another application (such as the note APP) to view and use the historical call information, and thus improves user convenience.

In addition, after the call request is monitored, if the first terminal had a call with the second terminal previously, the historical call information can still be displayed on the current call interface.

Figure 2A:
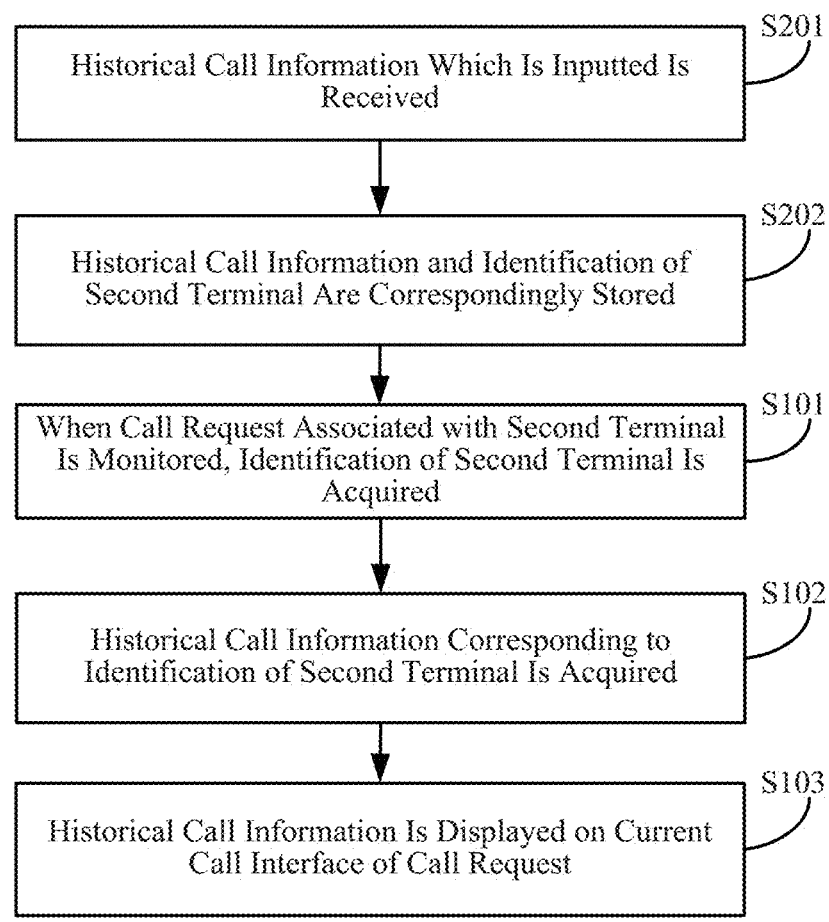
FIG. 2A is a flowchart of a call processing method according to an exemplary embodiment.

FIG. 2A is a flowchart of a call processing method 200 according to an exemplary embodiment. As shown in FIG. 2A, in addition to steps S101, S102, and S103 (FIG. 1), the method 200 further includes steps S201 and S202 before step S101.

In step S201, the historical call information which is inputted is received.

The historical call information can be inputted when a call with the second terminal is being performed, or when a call with second terminal is ended, or the like, and the historical call information can include one or more calls within a preset historical time period.

In the exemplary embodiment, to facilitate the input of the historical call information, a call information option is added to the call interface. Therefore, a trigger operation for receiving the historical call information can be selecting the call information option. Thus, when it is monitored that the call information option is selected, the historical call information which is inputted is received.

Additionally, in order to display the historical call information on the current call interface, a display control is added into a blank area on the call interface to display the historical call information in a preset display area corresponding to the display control. Therefore, the trigger operation for receiving the historical call information may include: monitoring a preset trigger operation for the preset display area, such as a click operation, or a long-press operation. When the preset trigger operation for the preset display area is monitored, the historical call information which is inputted is received.

In step S202, the historical call information and the identification of the second terminal are correspondingly stored.

The identification of the second terminal may include the contact information of the second terminal, the appellation of the second terminal, etc.

The historical call information and the identification of the second terminal are correspondingly stored and thus, when the call request is monitored, the historical call information corresponding to the second terminal can be automatically acquired according to the identification of the second terminal.

Further, when the historical call information and the identification of the second terminal are correspondingly stored, the historical call information and the identification of the second terminal can be stored in any location of the first terminal, such as a database, or an APP.

Figure 2B:
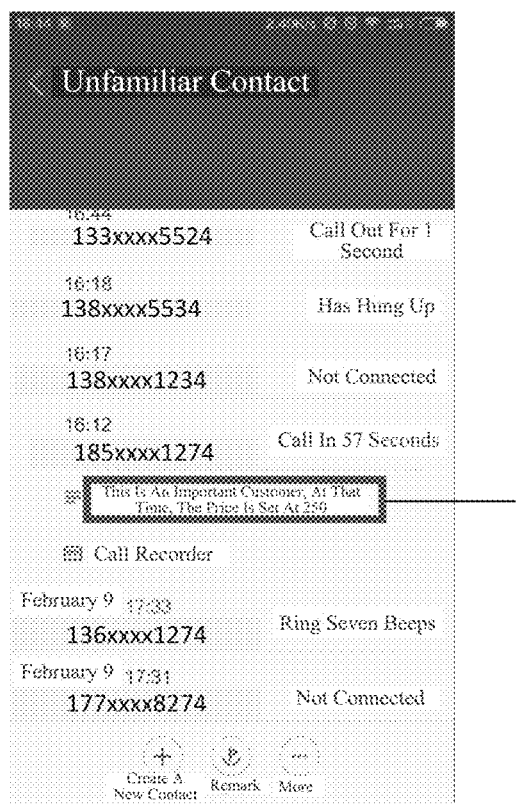
FIG. 2B is a schematic diagram of a call record interface displaying historical call information according to an exemplary embodiment.

In one embodiment, the method 200 further includes displaying both of the historical call information and the identification of the second terminal on a call record interface, as shown in FIG. 2B.

In FIG. 2B, both of the historical call information and the identification of the second terminal can be displayed on the call record interface of the first terminal by adding a call information field to the call record interface. Thus, it is convenient for the user of the first terminal to view the historical call information via the call record interface.

Figure 3:
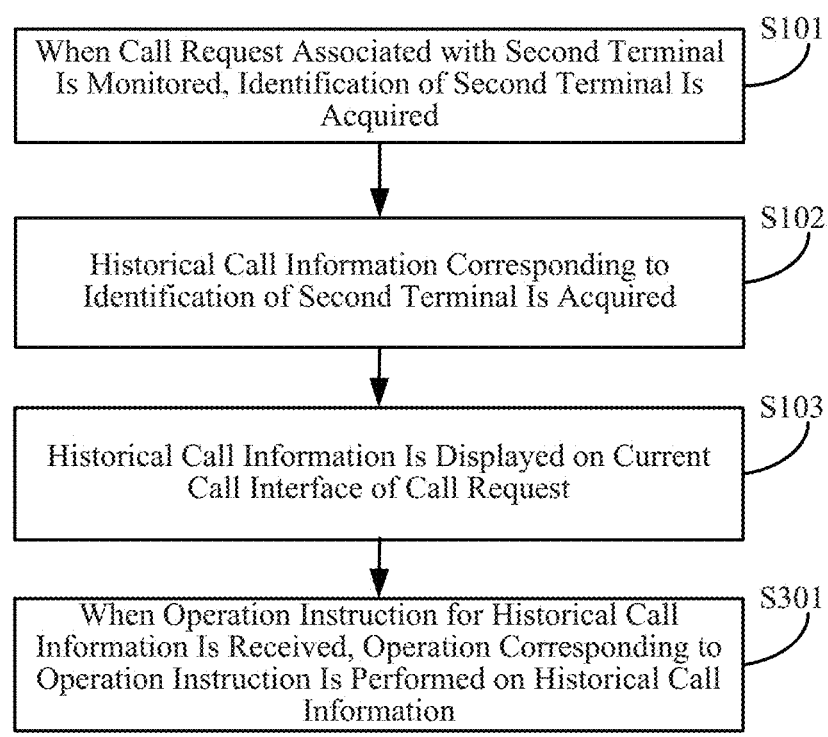
FIG. 3 is a flowchart of a call processing method according to an exemplary embodiment.

FIG. 3 is a flowchart of a call processing method 300, according to an exemplary embodiment. As shown in FIG. 3, in addition to steps S101, S102, and S103 (FIG. 1), the method 300 further includes step S301.

In step S301, when an operation instruction for the historical call information is received, an operation corresponding to the operation instruction is performed on the historical call information. The operation instruction may be a copy instruction, an edit instruction, a delete instruction, etc., and the edit instruction can be a modify instruction, an add instruction, and the like.

In the exemplary embodiment, when the operation instruction for the historical call information is received, the operation corresponding to the operation instruction can be performed on the historical call information. Thus, the user can freely perform operations on the historical call information, such as copy, modify, add, and delete.

Further, when the operation corresponding to the operation instruction is performed on the historical call information according to the received operation instruction, the operation can be performed on the call record interface or the current call interface, as follows.

If the operation is performed on the call record interface, a plurality of different operation options (such as delete, modify, add, and copy option) for the historical call information can be provided. Once the user selects certain historical call information, these operation options can be displayed, and when it is monitored that a certain option is selected, it can be confirmed that the operation instruction corresponding to the option is received, and then the operation is performed.

If the operation is performed on the current call interface, different operation actions can be preset for different operation instructions. Thus, when a certain operation action inputted for an area displaying the historical call information on the current call interface is monitored, the received operation instruction can be accurately identified according to the operation action.

Figure 4:
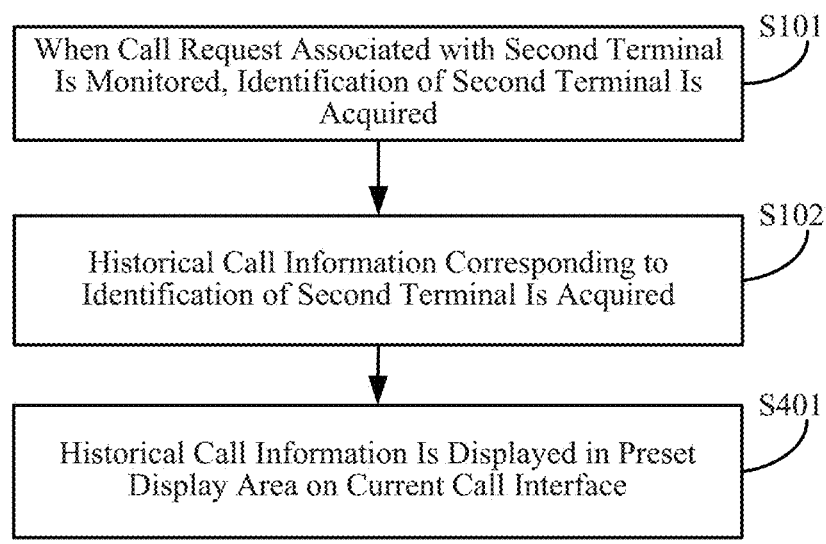
FIG. 4 is a flowchart of a call processing method according to an exemplary embodiment.

FIG. 4 is a flowchart of a call processing method 400, according to an exemplary embodiment. As shown in FIG. 4, in addition to steps S101 and S102 (FIG. 1), the method 400 includes step S401, which may be included in step S103 (FIG. 1).

In step S401, the historical call information is displayed in a preset display area on the current call interface.

In the exemplary embodiment, when the historical call information is displayed, since the historical call information is displayed in the preset display area on the current call interface, the user can easily view previous recorded historical call information via the call interface to quickly recall previous call contents. Thus, the efficiency of the current call can be improved.

Further, display parameters of the preset display area, such as size, shape, and color, can be configured by the display control.

Figure 5:
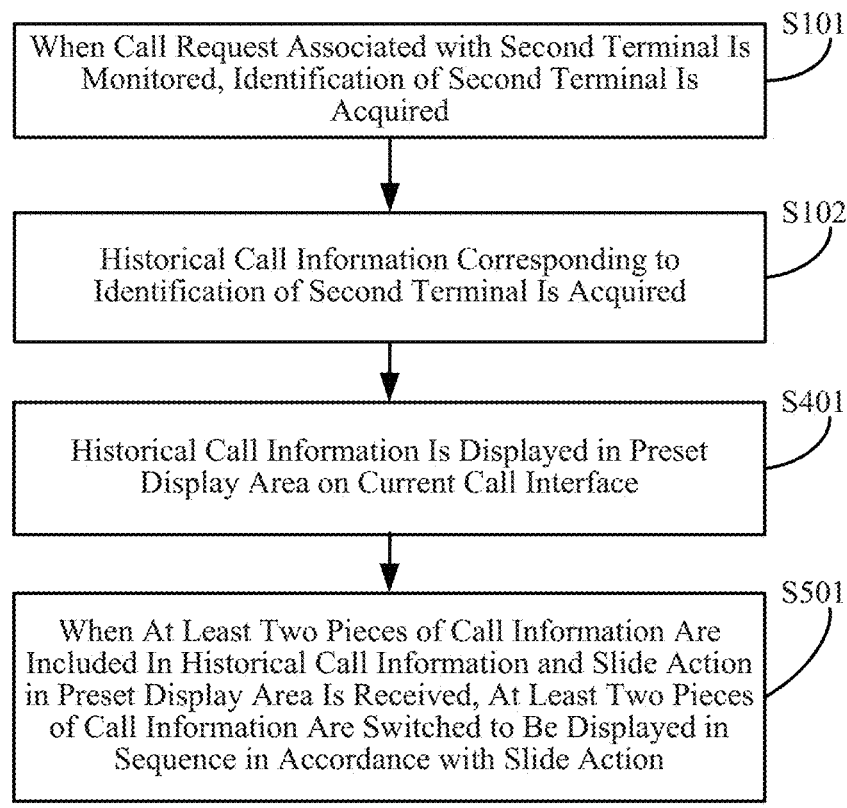
FIG. 5 is a flowchart of a call processing method according to an exemplary embodiment.

FIG. 5 is a flowchart of a call processing method 500, according to an exemplary embodiment. As shown in FIG. 5, in addition to steps S101, S102, and S401 (FIG. 4), the method 500 further includes step S501.

In step S501, when at least two pieces of call information are included in the historical call information and a slide action in the preset display area is received, the at least two pieces of call information are switched to be displayed in sequence in accordance with the slide action.

In the exemplary embodiment, when multiple pieces of call information are included in the historical call information, if the slide action in the preset display area is received, the multiple pieces of call information can be switched to be displayed according to the slide action. Thus, the user can easily view the different call information by the slide action.

Further, a slide direction of the slide action can be from top to bottom, from bottom to top, from left to right, or from right to left, and previous or next call information can be switched to be displayed according to a recorded date of the historical call information.

Figure 6:
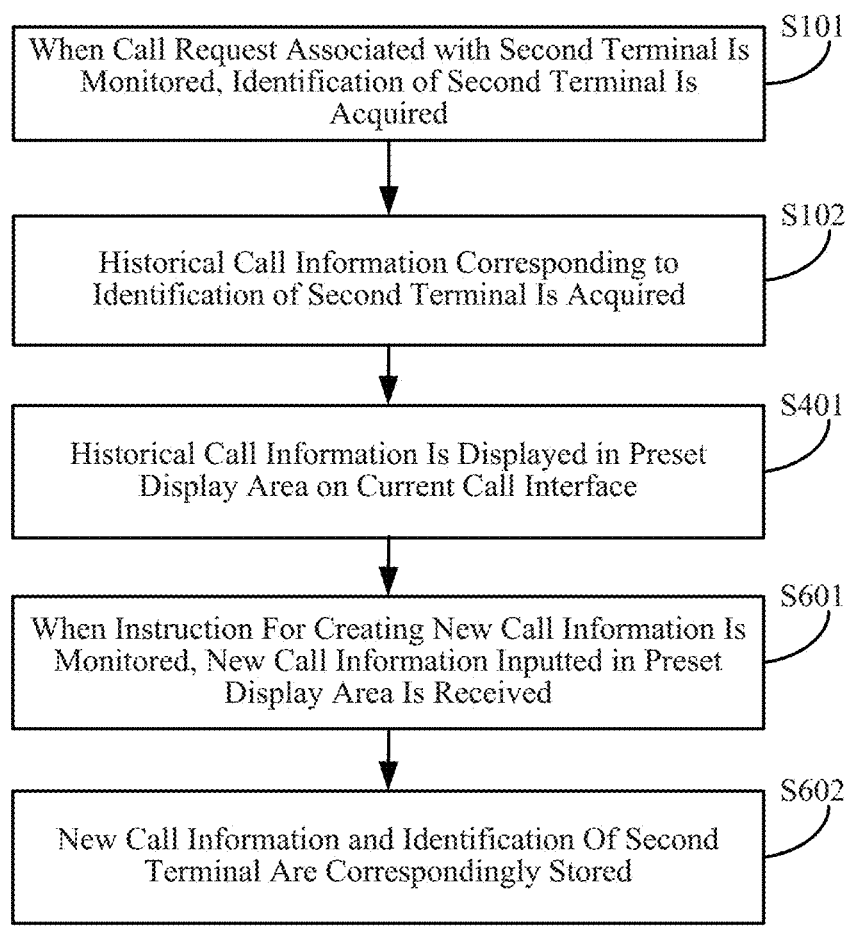
FIG. 6 is a flowchart of a call processing method according to an exemplary embodiment.

FIG. 6 is a flowchart of a call processing method 600, according to an exemplary embodiment. As shown in FIG. 6, in addition to steps S101, S102, and S401 (FIG. 4), the method 600 further includes steps S601 and S602.

In step S601, when an instruction for creating new call information is monitored, new call information inputted in the preset display area is received.

In the exemplary embodiment, the instruction for creating the new call information can be generated from a selection operation performed by the user on the call information option in the call interface, or a trigger operation performed by the user in the preset display area. The trigger operation can be a click operation performed by the user on a "+" identification when the "+" identification is displayed at a certain location in the preset display area.

In step S602, the new call information and the identification of the second terminal are correspondingly stored.

In the exemplary embodiment, when the instruction for creating the new call information is monitored, if the new call information inputted via the preset display area is received, the new call information and the identification of the second terminal can be correspondingly stored, so that the new call information of this record can be automatically acquired, as historical call information, according to the identification of the second terminal. Thus, subsequent call efficiency can be improved.

Corresponding to the above call processing methods, embodiments of the present disclosure further provide call processing devices.

Figure 7:
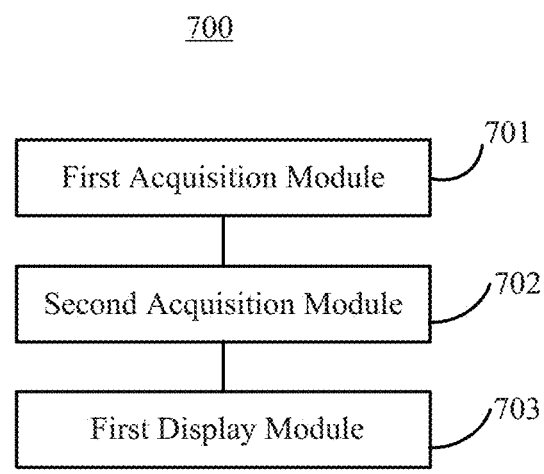
FIG. 7 is a block diagram of a call processing device according to an exemplary embodiment.

FIG. 7 is a block diagram of a call processing device 700, according to an exemplary embodiment. The device 700 is applied in a first terminal. As shown in FIG. 7, the device 700 includes a first acquisition module 701, a second acquisition module 702, and a first display module 703.

The first acquisition module 701 is configured to, when a call request associated with a second terminal is monitored, acquire an identification of the second terminal.

The second acquisition module 702 is configured to acquire historical call information corresponding to the identification of the second terminal.

The first display module 703 is configured to display the historical call information on a current call interface of the call request.

When the call request is monitored, since the identification of the second terminal is acquired, the historical call information corresponding to the identification of the second terminal can be automatically acquired to display the historical call information on the current call interface of the call request. Thus, a user of the first terminal can timely understand and recall the recorded historical call information corresponding to the second terminal based on the current call interface, and can make an efficient communication with a user of the second terminal.

Further, the historical call information corresponds to the identification of the second terminal, such as the contact information, or the appellation. Thus, even if the user of the first terminal does not save, e.g., the contact information of the second terminal in an address book, the user of the first terminal can still find the historical call information according to the contact information of the second terminal displayed on the call interface. Thus, the user of the first terminal can quickly and easily recall previous call contents without adding the identification of the second terminal to the address book, which is helpful for an efficient communication between the user of the first terminal and the user of the second terminal. The device 700 being capable of automatically finding the historical call information can also avoid the problem that the user of the first terminal needs to switch to an interface of another application (such as the note APP) to view and use the historical call information, and thus improves user convenience.

Figure 8:
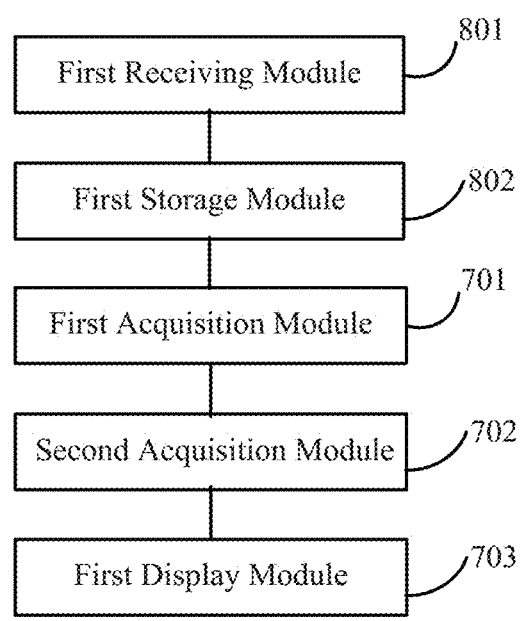
FIG. 8 is a block diagram of a call processing device according to an exemplary embodiment.

FIG. 8 is a block diagram of a call processing device 800, according to an exemplary embodiment. As shown in FIG. 8, in addition to the first acquisition module 701, the second acquisition module 702, and the first display module 703 (FIG. 7), the device 800 further includes a first receiving module 801 and a first storage module 802.

The first receiving module 801 is configured to, before acquiring the historical call information corresponding to the identification of the second terminal, receive the historical call information which is inputted.

The first storage module 802 is configured to correspondingly store the historical call information and the identification of the second terminal.

The identification of the second terminal may be the contact information of the second terminal or the appellation of the second terminal.

The historical call information and the identification of the second terminal are correspondingly stored. Thus, when the call request is monitored, the historical call information corresponding to the second terminal can be automatically acquired according to the identification of the second terminal.

In one embodiment, the device 800 further includes a second display module (not shown) configured to display both of the historical call information and the identification of the second terminal on a call record interface.

Both of the historical call information and the identification of the second terminal can be displayed on the call record interface of the second terminal by adding a call information field to the call record interface. Thus, it is convenient for the user of the first terminal to view the historical call information via the call record interface.

Figure 9:
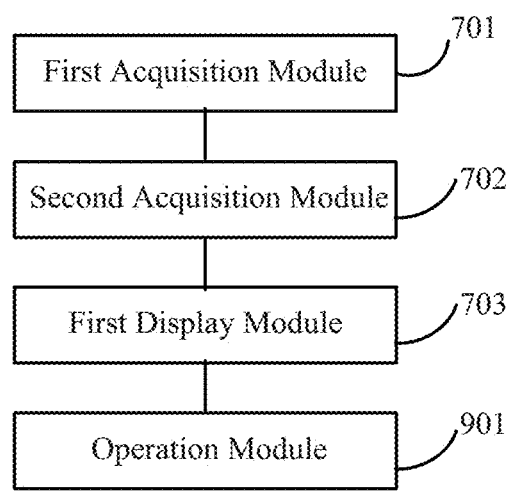
FIG. 9 is a block diagram of a call processing device according to an exemplary embodiment.

FIG. 9 is a block diagram of a call processing device 900, according to an exemplary embodiment. As shown in FIG. 9, in addition to the first acquisition module 701, the second acquisition module 702, and the first display module 703 (FIG. 7), the device 900 further includes an operation module 901.

The operation module 901 is configured to, when an operation instruction for the historical call information is received, perform an operation corresponding to the operation instruction on the historical call information. The operation instruction may be a copy instruction, an edit instruction, and a delete instruction.

In the exemplary embodiment, when the operation instruction for the historical call information is received, the operation corresponding to the operation instruction can be performed on the historical call information, and thus, the user can freely perform operations on the historical call information, such as copy, modify, add and delete.

Further, when the operation corresponding to the operation instruction is performed on the historical call information according to the received operation instruction, the operation can be performed on the call record interface or the current call interface.

Figure 10:
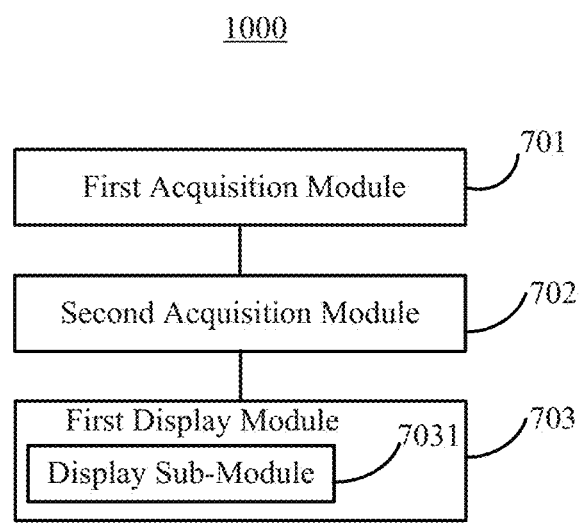
FIG. 10 is a block diagram of a call processing device according to an exemplary embodiment.

FIG. 10 is a block diagram of a call processing device 1000, according to an exemplary embodiment. As shown in FIG. 10, the device 1000 includes the first acquisition module 701, the second acquisition module 702, and the first display module 703 (FIG. 7), and the first display module 703 further includes a display sub-module 7031.

The display sub-module 7031 is configured to display the historical call information in a preset display area on the current call interface.

In the exemplary embodiment, when the historical call information is displayed, since the historical call information is displayed in the preset display area on the current call interface, the user can easily view previous recorded historical call information via the call interface to quickly recall previous call contents. Thus, the efficiency of the current call can be improved.

Further, display parameters of the preset display area, such as size, shape, and color, can be configured by a display control.

Figure 11:
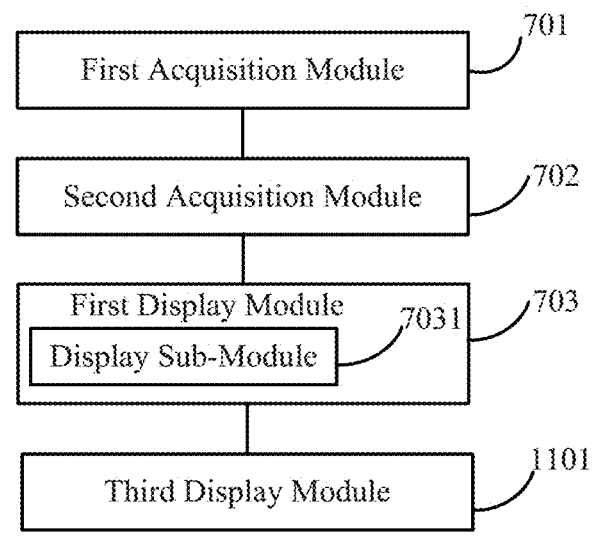
FIG. 11 is a block diagram of a call processing device according to an exemplary embodiment.

FIG. 11 is a block diagram of a call processing device 1100, according to an exemplary embodiment. As shown in FIG. 11, in addition to the first acquisition module 701, the second acquisition module 702, and the first display module 703 (FIG. 10), the device 1100 further includes a third display module 1101.

The third display module 1101 is configured to, when at least two pieces of call information are included in the historical call information and a slide action in the preset display area is received, display the at least two pieces of call information in sequence in accordance with the slide action.

In the exemplary embodiment, when multiple pieces of call information are included in the historical call information, if the slide action in the preset display area is received, the multiple pieces of call information can be switched to be displayed according to the slide action. Thus, the user can easily view the different call information by the slide action.

Further, a slide direction of the slide action can be from top to bottom, from bottom to top, from left to right, or from right to left, and previous or next call information can be switched to be displayed according to a recorded date of the historical call information.

Figure 12:
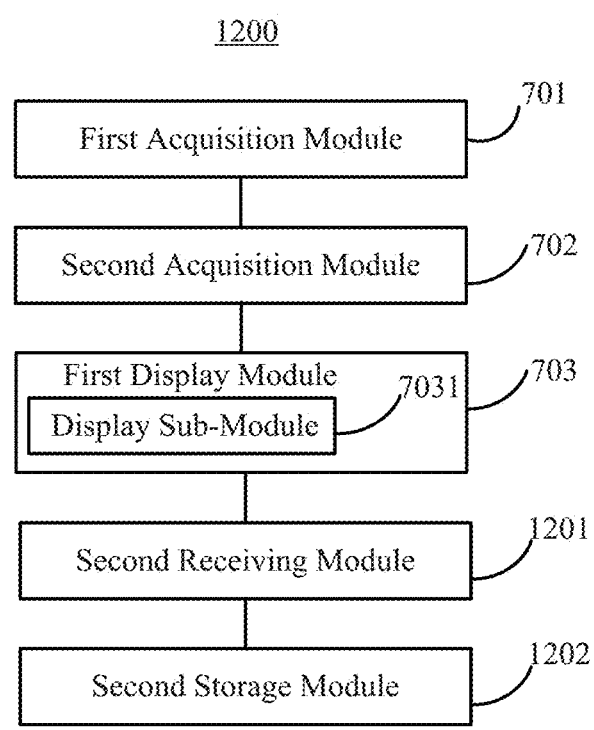
FIG. 12 is a block diagram of a call processing device according to an exemplary embodiment.

FIG. 12 is a block diagram of a call processing device 1200, according to an exemplary embodiment. As shown in FIG. 12, in addition to the first acquisition module 701, the second acquisition module 702, and the first display module 703 (FIG. 10), the device 1200 further includes a second receiving module 1201 and a second storage module 1202.

The second receiving module 1201 is configured to, when an instruction for creating new call information is monitored, receive new call information inputted in the preset display area.

The second storage module 1202 is configured to correspondingly store the new call information and the identification of the second terminal.

In the exemplary embodiment, when the instruction for creating the new call information is monitored, if the new call information inputted via the preset display area is received, the new call information and the identification of the second terminal can be correspondingly stored, so that the new call information of this record can be automatically acquired, as historical call information, according to the identification of the second terminal. Thus, subsequent call efficiency can be improved.

Figure 13:
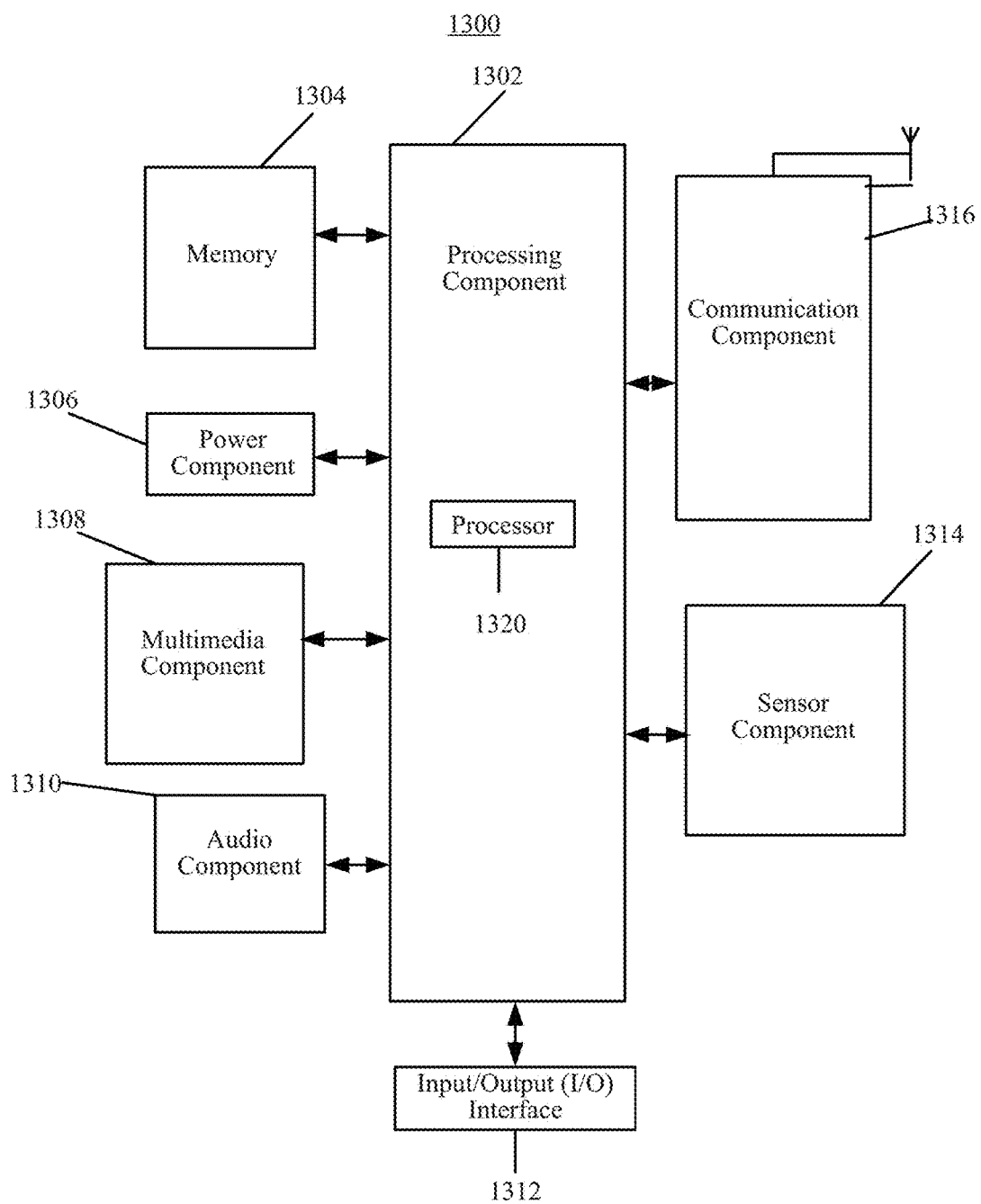
FIG. 13 is a block diagram of a device for call processing according to an exemplary embodiment.

FIG. 13 is a block diagram of a device 1300 for call processing, according to an exemplary embodiment. The device 1300 may be a terminal. For example, the device 1300 may be a mobile phone, a computer, a digital broadcast terminal, a messaging device, a gaming console, a tablet, a medical device, exercise equipment, a personal digital assistant, an unmanned aerial vehicle, and the like.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone configured to receive an external audio signal when the device 1300 is in an operation mode, such as a calling mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, 3G, or 4G, or a combination thereof.

In one exemplary embodiment, the communication component 1316 receives a broadcast signal or broadcast associated information from an external broadcast management system via a broadcast channel In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A call processing method, performed by a processor of a first mobile terminal, the method comprising:
   when a call request associated with a second mobile terminal is monitored, displaying a call interface of a call application on a screen of the first mobile terminal;
   acquiring an identification of the second mobile terminal;
   automatically acquiring historical call information corresponding to the identification of the second mobile terminal;
   displaying the historical call information on the call interface; and
   when an operation instruction for the historical call information is received, performing an operation corresponding to the operation instruction on the call interface to manipulate the historical call information,
   wherein the historical call information is configured to be viewed and manipulated directly on the call interface, and wherein the historical call information is displayed without switching to an interface of another application.

2. The method according to claim 1, before acquiring the historical call information corresponding to the identification of the second mobile terminal, the method further comprising:
   receiving the historical call information which is inputted; and
   correspondingly storing the historical call information and the identification of the second mobile terminal.

3. The method according to claim 2, wherein the displaying the historical call information on the call interface comprises:
   displaying the historical call information in a preset display area on the call interface.

4. The method according to claim 1, further comprising:
   displaying the historical call information and the identification of the second mobile terminal on a call record interface.

5. The method according to claim 4, wherein the displaying the historical call information on the call interface comprises:
   displaying the historical call information in a preset display area on the call interface.

6. The method according to claim 1, wherein the displaying the historical call information on the call interface comprises:
   displaying the historical call information in a preset display area on the call interface.

7. The method according to claim 6, further comprising:
   when at least two pieces of call information are included in the historical call information and a slide action in the preset display area is received, displaying the at least two pieces of call information in sequence in accordance with the slide action.

8. The method according to claim 6, further comprising:
   when an instruction for creating new call information is monitored, receiving new call information inputted in the preset display area; and
   correspondingly storing the new call information and the identification of the second mobile terminal.

9. A first mobile terminal, comprising:
   a processor; and
   a memory for storing instructions executable by the processor;
   wherein the processor is configured to:
   when a call request associated with a second mobile terminal is monitored, display a call interface of a call application on a screen of the first mobile terminal;
   acquire an identification of the second mobile terminal;
   automatically acquire historical call information corresponding to the identification of the second mobile terminal;
   display the historical call information on the call interface; and
   when an operation instruction for the historical call information is received, perform an operation corresponding to the operation instruction on the call interface to manipulate the historical call information,
   wherein the historical call information is configured to be viewed and manipulated directly on the call interface, and wherein the historical call information is displayed without switching to an interface of another application.

10. The first mobile terminal according to claim 9, wherein the processor is further configured to:
    receive the historical call information which is inputted; and
    correspondingly store the historical call information and the identification of the second mobile terminal.

11. The first mobile terminal according to claim 10, wherein the processor is further configured to:
    display the historical call information in a preset display area on the call interface.

12. The first mobile terminal according to claim 9, wherein the processor is further configured to:
    display the historical call information and the identification of the second mobile terminal on a call record interface.

13. The first mobile terminal according to claim 12, wherein the processor is further configured to:
    display the historical call information in a preset display area on the call interface.

14. The first mobile terminal according to claim 9, wherein the processor is further configured to:
    display the historical call information in a preset display area on the call interface.

15. A non-transitory computer-readable storage medium having stored therein instructions that, when executed by a processor of a first mobile terminal, cause the first mobile terminal to perform a call processing method comprising:
    when a call request associated with a second mobile terminal is monitored, displaying a call interface of a call application on a screen of the first mobile terminal;
    acquiring an identification of the second mobile terminal;
    automatically acquiring historical call information corresponding to the identification of the second mobile terminal;
    displaying the historical call information on the call interface; and
    when an operation instruction for the historical call information is received, performing an operation corresponding to the operation instruction on the call interface to manipulate the historical call information,
    wherein the historical call information is configured to be viewed and manipulated directly on the call interface, and wherein the historical call information is displayed without switching to an interface of another application.

* * * * *